Figure 1:
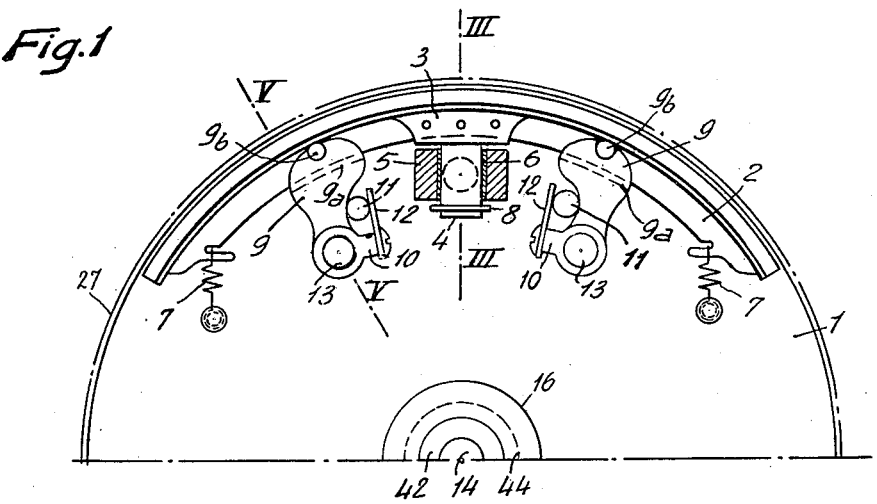

Sept. 19, 1961 M. BOCHORY 3,000,480
AUTOMATIC CLUTCH CONSTRUCTION
Filed Oct. 3, 1956 6 Sheets-Sheet 1

Inventor:
Michael Bochory
by: Michael S. Strike

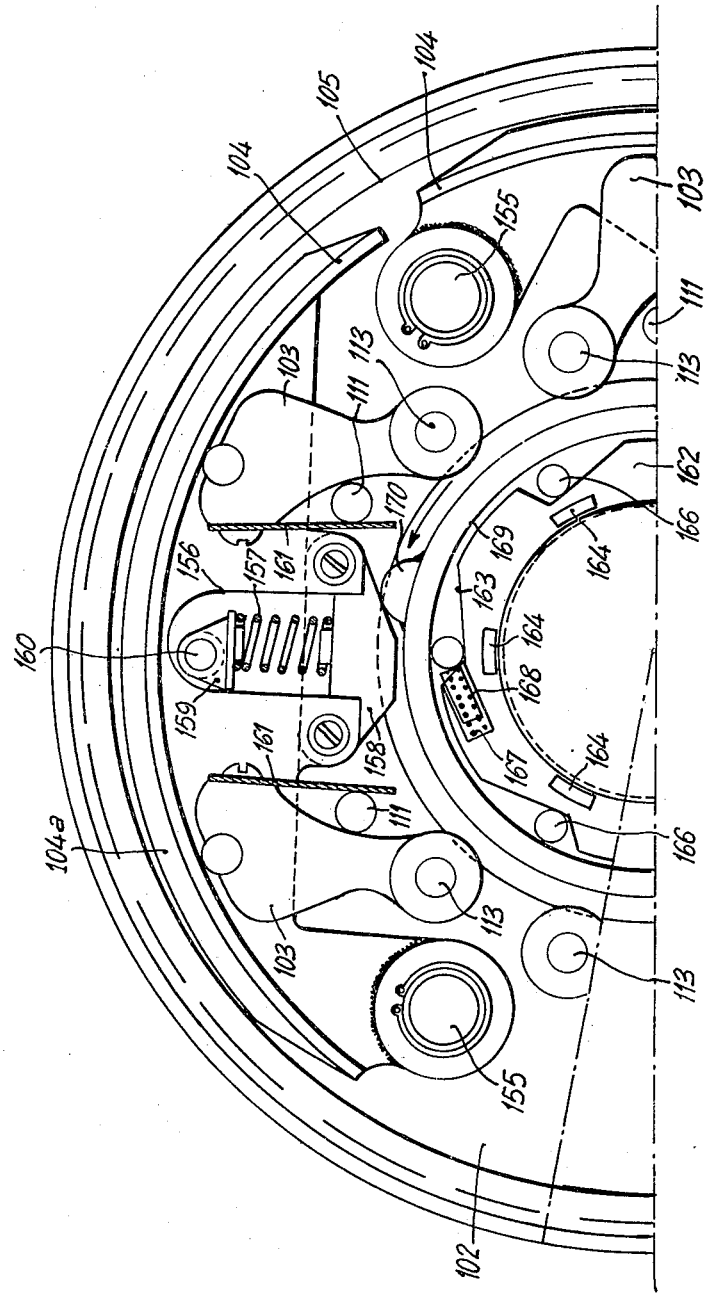

Sept. 19, 1961 M. BOCHORY 3,000,480
AUTOMATIC CLUTCH CONSTRUCTION
Filed Oct. 3, 1956 6 Sheets-Sheet 3
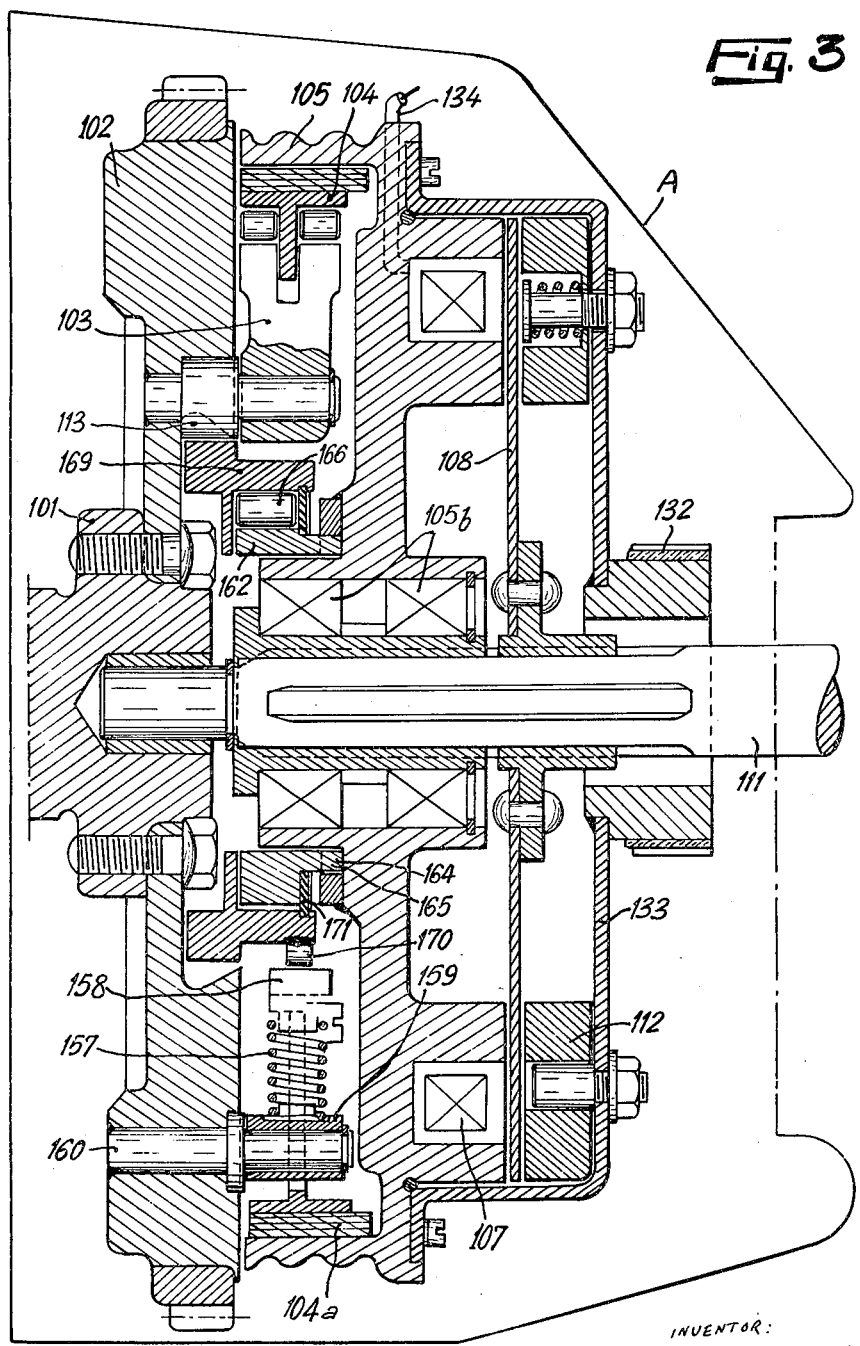
INVENTOR:
MICHAEL BOCHORY
BY: Michael S. Striker
agt.

Sept. 19, 1961  M. BOCHORY  3,000,480
AUTOMATIC CLUTCH CONSTRUCTION
Filed Oct. 3, 1956  6 Sheets-Sheet 4
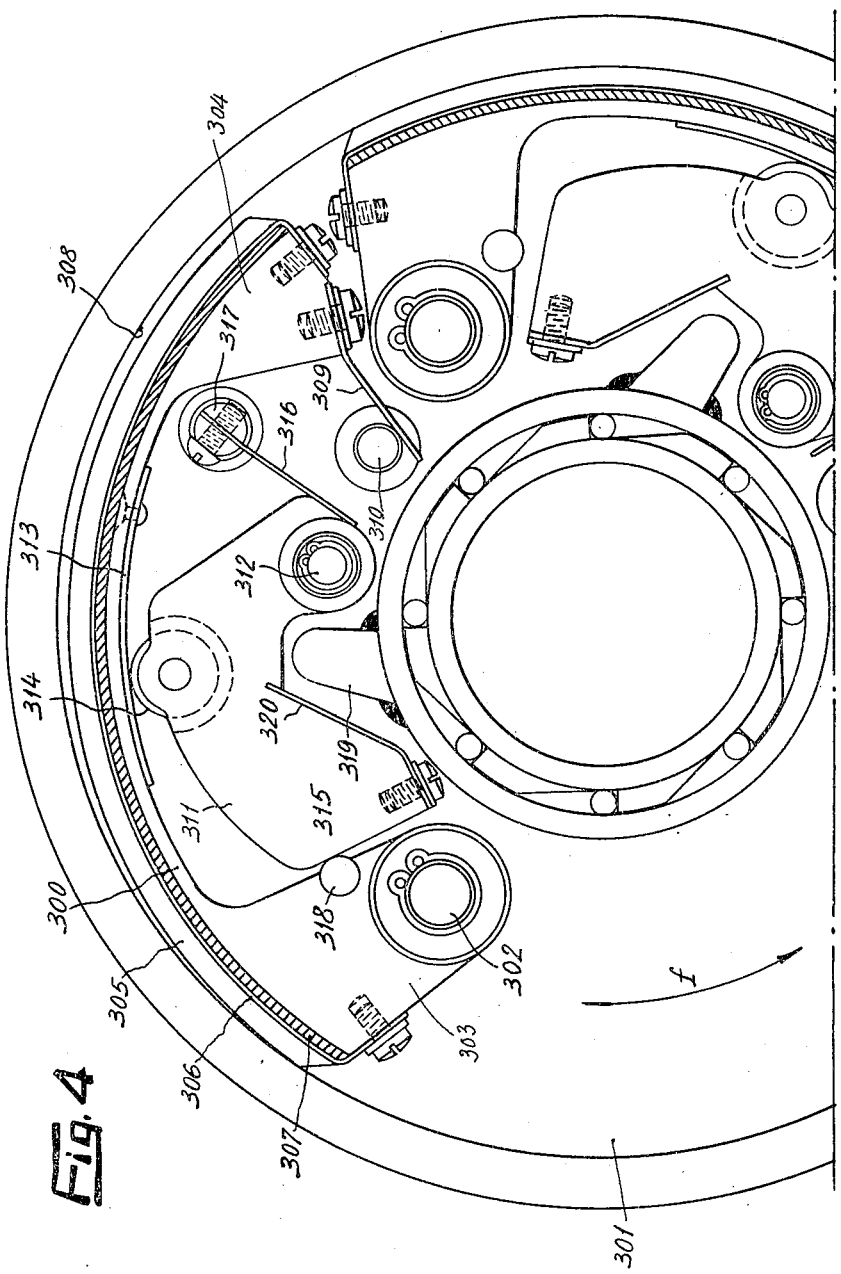
INVENTOR:
MICHAEL BOCHORY
BY: Michael S. Striker
Agt.

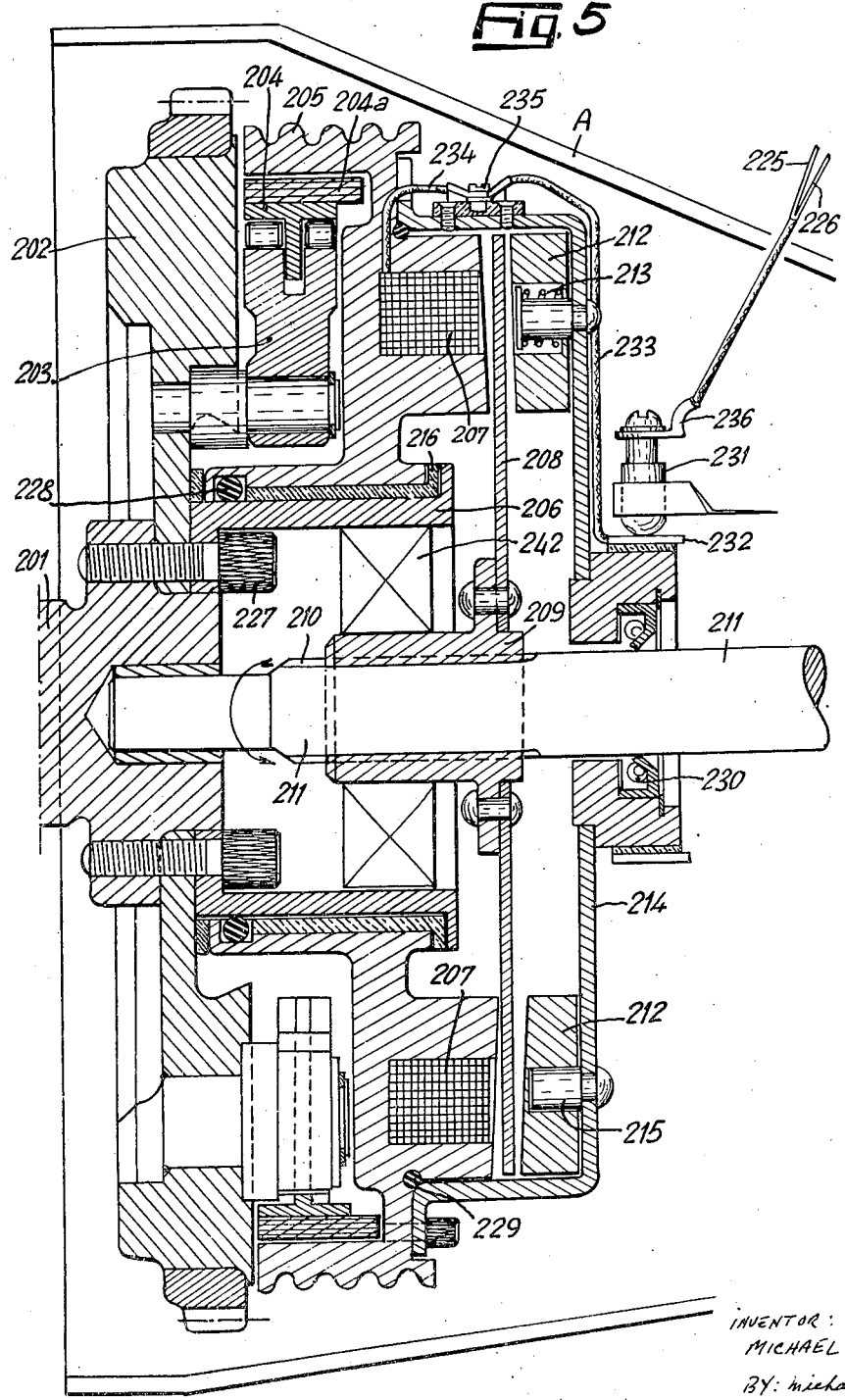

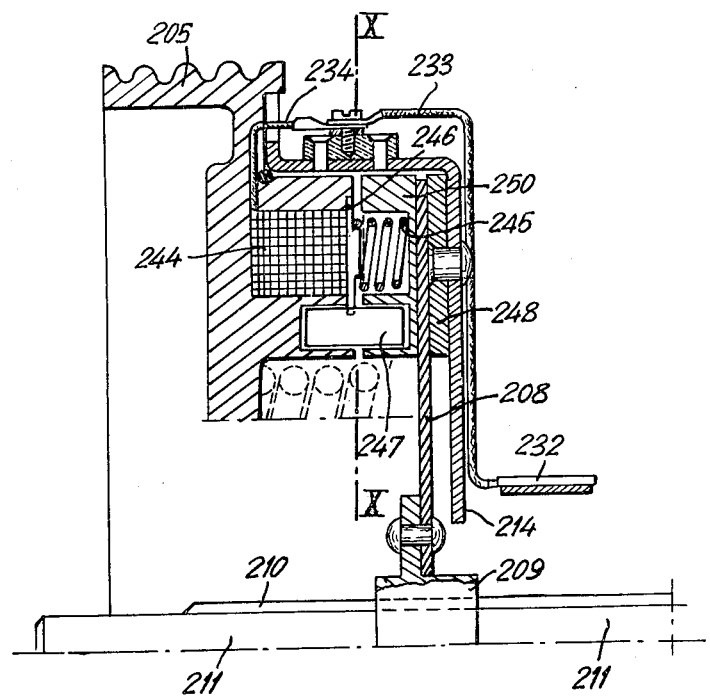
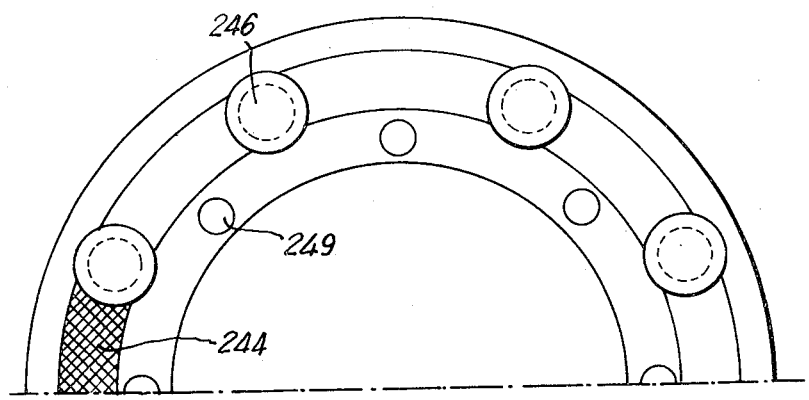

United States Patent Office 3,000,480
Patented Sept. 19, 1961

3,000,480
AUTOMATIC CLUTCH CONSTRUCTION
Michael Bochory, 4 Villa Jocelyn, Square Lamartine,
Paris, France
Filed Oct. 3, 1956, Ser. No. 613,713
Claims priority, application France Oct. 6, 1955
22 Claims. (Cl. 192—48)

The present invention relates to improvements in the centrifugal clutch according to co-pending patent application No. 458,926, now U.S. Patent No. 2,899,033.

In the said specification there is described an automatic clutch for vehicles or other apparatus comprising a power transmission system, the said clutch comprising in combination a main centrifugal coupling (controlled by out-of-balance weights acting on clutch shoes) and a normal coupling controlled, for example, electrically.

These improvements have mainly for their object to give the main coupling a progressive action in two phases due to the provision of a retaining spring, on the weights, so that in a first phase the shoes alone act, and the weights subsequently act only when the speed is sufficient for the action of the springs thereof to be overcome by the centrifugal force.

A further object of the said improvements is to improve the regularity and the power of the main coupling and to obviate any "juddering" by mounting the pivoting shoes on a pin in the neighborhood of one of the ends thereof, and at least one of the weights co-acting with the said shoe in such manner that the direction of the rotation thereof is opposite to the direction of rotation of the shoe.

A further object of the said improvements is also to impart a progressive and nevertheless positive action to the magnetic coupling by giving the clutch disc the form of a thin disc having low inertia, preferably of bare metal, operating in a bath of lubricating liquid, by designing the said disc in conical form, preferably with radial slots to assist in the rapid detachment without remanence, by disposing the said disc between the electromagnet and an armature maintained by a spring so that the engagement, and the disengagement of the clutch may take place positively, and by providing, with a view to a progressive action, a double control circuit, one part of which acts on the electromagnet and the other on the electromagnet and the armature.

Yet a further object of the said improvements is to improve the braking by the engine by providing in the free-wheel device (which ensures the driving by the driven shaft when the vehicle is driving the engine) means for driving the shoes either directly or through the out-of-balance weights.

Figure 6:
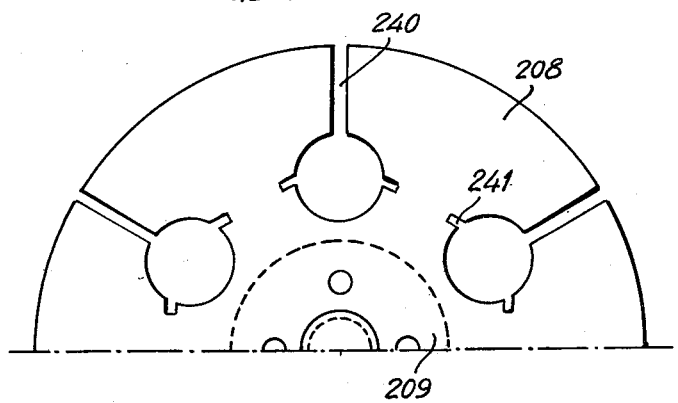
Figure 7:
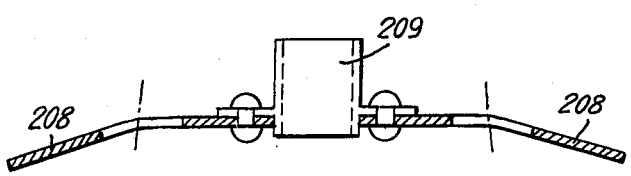
Figure 8:
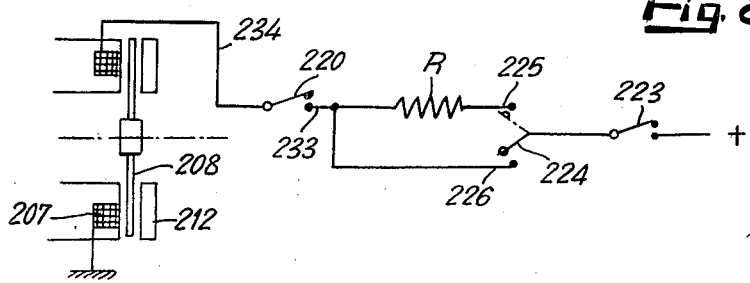

Further features of the said device will become apparent from the following description of various constructional forms of the said clutch, which has been illustrated by way of example in the accompanying drawings, in which:

FIGURE 1 is a diagrammatic front view showing the members of the centrifugal coupling, FIGURES 2 and 3 are diagrammatic front and axial sectional views, similar to FIGURE 1, of a modified construction, FIGURE 2 corresponding to the inoperative position and FIGURE 3 to the operative position, FIGURE 4 is a diagrammatic front view of another modification, FIGURE 5 is a longitudinal axial section through another modified construction, FIGURES 6 and 7 are a plan view and a sectional view respectively of the electromagnetic coupling disc, FIGURE 8 is a corresponding electric circuit diagram, and FIGURES 9 and 10 are fragmentary views of another modified form, in axial section and in section along the line X—X of FIGURE 9 respectively.

In order to improve the progressivity of the starting, while maintaining the rapidity thereof, and to reduce the weight and consequently the inertia effects, the out-of-balance weights of the centrifugal coupling are disposed in accordance with the present invention in such manner as to come into action and to add their effects to those of the shoes or jaws only when the latter have commenced the clutch engagement, that is to say, when the speed of rotation has reached a predetermined value. In the example of FIGURE 1, the weights comprise for this purpose a boss 10 on which is fixed a spring blade 12 which bears on an abutment 11 in such manner that until the speed of rotation reaches the critical value the weight 9 continues to bear against the abutment 11.

The clutch engagement is consequently effected in two phases. In a first phase, the shoes 2 move under the influence of the centrifugal force towards the drum 27 diagrammatically illustrated in FIGURE 1 and come into contact therewith without the weights 9 having commenced to make their action felt. In a second phase, the centrifugal force being sufficient for the weights to cause flexure of the springs 12, the weights 9 move and bear against the shoes, thus adding their effect to that of the said shoes.

In addition, the weight is disposed in such manner that when it moves under the action of the centrifugal force it produces a powerful effect on the shoe. The path followed by the bearing roller 9b is oblique in relation to the surface of the shoe, whereby its effectiveness is multiplied.

This arrangement may be adopted by means of any adaptation of details necessary for any particular form of the shoe, notably for that illustrated in the parent patent.

In order further to improve the gentleness of the centrifugal coupling and the regularity of its operation, the shoes may be disposed as illustrated in FIGURES 2 and 3.

In this constructional form, there are disposed in a gearbox A a driving shaft 101, a flywheel 102, a combined mechanism comprising centrifugal weights 103 and shoes 104 which, through an appropriate lining 104a, drives the drum 105 when the speed of the engine reaches the predetermined value.

The drum 105 is mounted loose on the driven shaft 111 through bearings 105b maintained by snap rings.

The shoes 104 are so mounted as to be fast with the driving flywheel 102 on spindles 155. The said shoes are each formed with a recess 156, in which is disposed a compression spring 157 (FIGURE 2).

The spring 157 rests at one end against the member 158 of special form, which is maintained on the shoe by screws. At the other end, the spring rests on a member 159 rocking on a spindle 160 fast with the driving flywheel 102. The supporting spindle thereof is slightly eccentric in relation to the spindle 160. The spring maintains the shoe in the disengaged position until the speed of the engine reaches a predetermined value.

The weights 103 maintained by spring blades 161 exert their pressure from a predetermined speed, beyond the speed at which the drum has already commenced to be driven by the shoes. The spring blades 161 mounted on the top of the weight have the advantage of maintaining a constant pressure by reason of the fact that the spring blade follows the same path as the weight. The abutment 111 disposed between the weight and the spring blade 161 acting by pressure has the object of maintaining the weight in the normal position when inoperative.

In the particularly interesting constructional form illustrated in FIGURE 4, each of the shoes 300 is, as in the case of FIGURES 2 and 3, mounted on the driving flywheel 301 which rotates in the direction f, by means of pin 302 situated substantially at one of the ends thereof. The shoe comprises two massive portions 303, 304, each at one of the ends, separated by a thin central portion. Preferably, as has been indicated in the parent specification, the shoe is provided with a lining 305 stuck on the spring blade 306, which rests on a rubber or like flexible plate 307, which in turn rests on the shoe 300. These arrangements permit the shoe to bear very uniformly on the drum 308 as also to absorb certain shocks during transmission. The active portion of the shoe is at the rear of the spindle 302 in relation to the direction of rotation f.

Preferably, the weight of the portion 304 is lower than that of the part 303, so as to ensure good distribution of the pressures and consequently uniform wear.

The shoe comprises in addition, in the neighborhood of its rear end, a spring blade 309 bearing on a pin 310 fast with the driving flywheel 301 and tending constantly to move the shoe away from the drum. The said spring is so calibrated that the shoe commences to bear on the drum so as to produce the clutch engagement only at a predetermined speed of rotation, for example 800 r.p.m.

Combined with each shoe is an out-of-balance weight 311 pivotally mounted on a pin 312 and bearing on the central portion, lined by a bearing plate of tempered steel 313 which distributes the pressure through a roller 314. The heavier portion of the weight 315 is at a relatively great distance from the pin 312 so that the distance from the centre of gravity to the said pin is greater than that from the centre of the roller.

A spring blade 316 mounted on a pin 317 fast with the driving flywheel bears on an appropriate boss on the weight in such manner as to move the weight away from the shoe. The strength of the said spring is such that the weight commences to act only at a speed higher than that at which the shoe has commenced to bear on the drum, for example 1000 r.p.m. Under these conditions, the clutch engagement is both progressive and positive.

On the other hand, there is provided on the shoe an abutment 318, consisting for example of an appropriate plastic material, to reduce the noise which is likely to result from shocks. Under these conditions, the two springs 309 and 316 maintain the shoe and the weight constantly in resilient contact with one another during slow running.

Preferably, the pin 317 is adapted to be adjusted in its orientation in order to permit adjustment of the bearing force of the spring 316.

It will be noted that the direction of rotation of the weight is opposite to that of the shoe, which is a favorable condition for stopping slipping from the instant when the weight has become operative.

On the other hand, in the examples of FIGURES 2, 3 and 4, the third coupling (consisting of a free-wheel or the like) effecting the driving of the driving shaft by means of the driven shaft in one direction when the speed of the latter is higher, is combined with the centrifugal coupling in such manner as to produce the lifting of the shoe as soon as the speed of the driven shaft becomes preponderant. For this purpose, in the case of the modification illustrated in FIGURES 2 and 3, the said free-wheel is constructed as follows: its inner portion 162 is formed with inclined surfaces 163 and dogs 164, engaging in dogs 165 (FIGURE 3), the latter being fast with the drum 105 (FIGURE 2).

The said free-wheel 162 comprises rollers 166, each of which is urged by a spring 167 through push members 168 against the outer portion 169 of the bearing. The outer portion 169 is lodged (FIGURE 2) on the side of the driving flywheel and rests freely on the pins of the weights 103. The cams 170 (FIGURE 2) welded to the periphery of the ring 169 have the object of lifting the member 158, as also the shoe 104. In FIGURE 3, 171 represents packing means for maintaining the lubricant in the bearing.

This free-wheel operates as follows:

When the speed of the engine falls below the speed of the driven shaft and the latter drives the drum 105, the lower portion 162 of the free-wheel is thus driven and the rollers 166 travel up the slope 163 and wedge the upper portion 169, which is thus also driven in the direction of the arrow. The boss or cam 170, in moving in the direction of the arrow, lifts the shoe 104 which, through the linings 104a, drives the drum progressively without producing the shocks which would be caused if the upper portion were directly fast with the driving flywheel.

When the speed of the engine increases, the free-wheel becomes detached, because the upper portion 169 drives the roller 166 down the slope.

In the example illustrated in FIGURE 4, the weight comprises in addition a recessed central portion into which there penetrates the corresponding dog 319 of the central free-wheel. The said weight also comprises a spring blade 320, against which the said dog bears when the speed of the driven shaft exceeds that of the driving shaft, so that the dog lifts the weight, which in turn moves the shoe towards the drum, thus producing the clutch engagement, whereby a lever effect is produced which reduces the torque of the free-wheel.

In the clutch devices of the type described in the parent patent, the centrifugal coupling is combined with an electromagnetic coupling for the gear changing, which comprises one or more electromagnets fast with the drum and energised by means of a contact which is closed when one of the gears is engaged, or vice versa according to the modification of FIGURE 9.

As is apparent from FIGURE 5, the electromagnetic clutch consists of a disc 208 disposed between the electromagnet 207 distributed in circular form and corresponding displaceable armatures 212, the whole being housed in a closed container formed by a casing 14 mounted on the drum 205 of the centrifugal clutch.

The drum 205 comprises coils 207 forming an electromagnet which, when placed under voltage, attracts the disc 208 fast with the sleeve 209, the latter being mounted on grooves 210 in the driven shaft 211. When the electromagnet is placed under voltage and attracts the disc 208, the armatures 212 retained by springs 213 are also attracted by the magnetic flux and compress the disc against the electromagnet.

The disc 208 consists of a steel plate disposed between the electromagnet 207 and the movable armature 212. The said disc could be provided with anti-friction linings. However, it appears to be preferable to leave it bare as illustrated in the drawing, which permits of obtaining gentler clutch engagement.

The disc in this example is sufficiently thin to avoid inertia and to be resilient and to form a spring, and it is divided into a number of sectors by slots 240, 241 (FIGURE 6) of any appropriate form, which permit bending of the said sectors. Under these conditions, despite the remanent magnetism of the electromagnet, the detachment at the instant of the interruption of the current may be instantaneous.

The said disc may be either plane in the inoperative condition, as illustrated in FIGURE 5, or slightly concave or conical as indicated in FIGURE 7.

The opposite faces of the electromagnet and of the armature may also be conical, as illustrated in FIGURE 5, the disc then being plane or having a conicity facing in the opposite direction to that of the armatures, again for avoiding remanence.

The armature 212 is fast with a casing 214 and is guided by guides 215. The said casing 214 is in turn fast with the drum 205. The elements of the electromagnetic coupling are then contained in a closed chamber, which preferably contains an appropriate lubricating liquid or the like.

When the disc is pressed against the electromagnet, it becomes fast with the drum 205 and with the casing 214, so that when the speed of the engine reaches the predetermined value and a gear is engaged, the centrifugal clutch and the electromagnetic clutch are fast with one another and the driven shaft 211 is consequently driven.

When the current is interrupted, the disc 208 becomes detached immediately by reason of its resilience, so that gear changing may be effected at all speeds. During this time, the springs 213 maintain the armature 212 against the casing 214.

FIGURE 8 is an electric circuit diagram of the current feed of the said electromagnetic coupling for ensuring progressive engagement thereof. The electromagnet 207 is fed through a contactor 220, which is controlled by a device acting by centrifugal force or of any other type, as a function of the speed of the engine, the said contactor remaining open as long as the engine has not reached a predetermined speed. The mechanism of the said contactor may be of any appropriate form and has been omitted from the drawings in order to avoid unnecessary complication thereof. The contactor 220 is in turn fed by one or other of two circuits in parallel, one of which comprises a resistance R. A change-over contact 224, the position of which is mechanically controlled by an acceleration pedal, can close either the contact 225 or the contact 226. The said circuit also includes a contact 223 which is closed by the engagement of any one of the gears.

Assuming the electric circuit thus to have been established, the operation is as follows:

*First phase: Engine stopped.*—The contact 220 is open, so that the electromagnet 207 receives no current, and the disc 208 is consequently disengaged.

*Second phase: Engine running slowly.*—The contact 220 is still open, and the contact 223, which is connected to the positive terminal of the battery and which is intended to be closed by the engagement of a gear, is still open. The change-over contact 224 controlled by the accelerator is in the position 225 during slow running. The contact 220 being open, the electromagnetic clutch remains disengaged.

*Third phase: Acceleration.*—On acceleration a little above normal slow running speed, the contact 224 moves into the position 226. The contact 220, which is controlled either by the centrifugal force exerted through an out-of-balance weight, or by any control as a function of the speed of the engine, closes and the current is ready to be transmitted through 226, 223, 220, 234 to the electromagnet 207, but since no gear has yet been engaged the contact 223 is open and the electromagnetic clutch is still disengaged.

*Fourth phase: Starting of the vhicle in first gear.*—The first gear is engaged and the contact 223 closes. On starting from slow running and progressive acceleration, the change-over contact 224 is first in the position 225. A current passes through the resistance R and the contactor 220 from the instant when the speed reaches a sufficient value. It is therefore a small current which feeds the electromagnet 207, which only attracts the disc 208, but is not sufficiently strong to attract the armatures 212 and to produce a vigorous locking of the disc. On further actuation of the accelerator pedal, the change-over contact 224 takes up the position 226 and transmits all the current from the battery to the contact 220. The latter closes, and if further acceleration takes place, the centrifugal mechanism drives the drum 205, the disc 208 and naturally the vehicle.

On changing from second, third or fourth gear or vice versa by actuation of the gear lever, the circuit is broken by opening of the contact 223. Since the electromagnet has no current, the disc 208 and the armature 212 become instantly disengaged. The clutch is disengaged and it is possible to change rapidly from one gear ratio to another. On changing down, it is necessary for the clutch engagement to take place without shocks on the transmission system, which is possible with the present device, since on operation of the gear lever from third to second gear, the foot is lifted from the accelerator, and the change-over contact 224 is thus moved into the position 225, the circuit extending through the fixed resistance R, which permits a gentler engagement of the clutch, while the locking of the disc between the electromagnet 207 and the armature 212 takes place with less pressure by reason of the voltage reduction produced by the resistance R.

The oil situated in the casing 214 assists in the cooling, as also in some slipping of the disc 208 and in the lubrication of the ring 216 (FIGURE 5. Fluid-tightness is obtained by means of the packing rings 228, 229 and 230. A friction member 231 insulated with respect to the earth of the vehicle slides on the collector 232, which is also insulated.

FIGURE 5 shows a direct connection with the electromagnet of the cable 233 and 234, the contact 220 having been omitted from this figure for the sake of simplicity. In practice, the contact 220 forming part of the electric circuit as indicated in FIGURE 8 may be inserted in the circuit 233—234.

In another modified form which is illustrated in FIGURES 9 and 10, the disc, instead of being between the electromagnet and the armature, is disposed between a friction plate fast with the rotating casing and the armature which is constantly moved away from the clutch drum by appropriate springs.

Mounted on the drum 205 is a winding 244 while there are formed in the said drum recesses 249 in which are disposed guides 247 of anti-magnetic material. The said guides extend at the other end into the recesses formed in an armature 250 maintained at a predetermined distance by springs 245.

At one end, the said springs abut the base of corresponding recesses formed in the armature 250, while at the other end they bear against washers 246 provided with shoulders for maintaining the springs. The said washers 246, which are also anti-magnetic are lodged in recesses formed in the electromagnet in such manner that their thickness does not extend beyond the face of the electromagnet. The armature 250 maintained by the guides 247 slides on the latter and normally maintains the disc 208 in compression under the pressure of the springs 245 against a packing plate or ring 248 fast with the casing 214. In this form, the disc 208 is fast with the drum 205 in the inoperative position by reason of the pressure exerted by the springs 245, and the said disc 208 is in turn fast with the driven shaft 211.

When it is desired to declutch for gear changing a contact controlled by the gear-changing system energises the electromagnet through the collector 232 and the cable 233 and 234. When the electromagnet is under voltage, it attracts the armature 250 sliding on the guides 247 and disengages the clutch 208.

It is possible to use a single central spring instead of a number of springs distributed circularly and the armature could comprise an extension towards the center, which would abut the said spring. This modified form is diagrammatically illustrated in chain lines in FIGURE 10, the result being the same.

It is also to be understood that this modified form may comprise a lined or unlined disc also operating in the dry state.

The electric circuit arrangement in this case will be the same, with the difference that the contractors will be reversed.

The present invention is not limited to the application described and may be employed with all clutches of any nature, as also with all automatic, semi-automatic or simply mechanical gearboxes. It is further to be understood that the invention is not limited to automobile vehicles, but is applicable also to all vehicles, industrial machines, aircraft, and the like.

I claim:

1. In an automatic centrifugal clutch having a drive shaft and a driven shaft, in combination, a centrifugal coupling comprising a drum operatively connected to one of said shafts for rotation therewith; a support operatively connected to the other of said shafts for rotation therewith; a plurality of shoes mounted on said support movable between an engaged position in which said shoes engage a peripheral surface of said drum and a disengaged position in which said shoes are spaced from said surface; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; at least one weight means for each of said shoes pivotally mounted on said support and movable independent of the movement of said shoes between an active position in which said weight means directly engages the corresponding shoe to press said shoe against said drum surface with increased pressure and an inactive position; and second spring means operatively connected to said weight means and tending to keep said weight means in said inactive position, said weight means turning from said inactive to said active position under the influence of centrfugal forces and said second spring means being constructed and arranged so as to exert a counter-moment on said weight means permitting turning of the same from said inactive to said active position thereof under the influence of said centrifugal forces only when said other shaft rotates at a predetermined high speed greater than said predetermined low speed, whereby said shoes move from said disengaged to said engaged positions when said other shaft rotates at said predetermined low speed while said weight means stay in said inactive position and said weight means move from said inactive to said active positions when said other shaft rotates at said high speed so that the clutch engagement takes place progressively in two successive stages.

2. An automatic centrifugal clutch as defined in claim 1, in which said drum is loosely mounted on said driven shaft, and including at least one electromagnet mounted on said drum; and a disc of magnetizable material mounted on said driven shaft for rotation therewith and for movement in axial direction of said shaft toward and away from said electromagnet so that upon energizing said electromagnet that disc is attracted and coupled with said drum, whereby said drum is coupled with said driven shaft for rotation therewith.

3. In an automatic centrifugal clutch according to claim 2, and including control means for controlling the current supply to said electromagnet, said control means including a circuit comprising two parallel paths of unequal resistance, a change-over switch controlled by an accelerator pedal permitting of passing the current into one path or the other, which permits either a gentle clutch engagement through the high-resistance path, or a rapid clutch engagement through the path of lower resistance.

4. In an automatic centrifugal clutch according to claim 2, in which said disc of the electromagnetic coupling is resilient, and consists for example of sheet steel, so as to form a spring in such manner as to be deformed by the attraction of the electromagnet and to become instantaneously detached therefrom when the current is interrupted.

5. In an automatic centrifugal clutch according to claim 2, and including an armature mounted on said driven shaft for rotation therewith and movable in axial direction thereof and in which said disc is disposed between the electromagnet and the movable armature, so that the frictional effect at the instant of the clutch engagemen is produced on both faces of said disc.

6. In an automatic centrifugal clutch according to claim 5, and including a fluid-tight casing rotating with the drum of the centrifugal clutch and containing a lubricating liquid, such as oil, the said casing supporting said armature and a conductor through which the current is fed to the electromagnet and a conductive ring connected to said conductor.

7. In a modified form of an automatic centrifugal clutch according to claim 5, and including spring means urging said armature away from said disc.

8. In an automatic centrifugal clutch according to claim 5, in which the opposite faces of the electromagnet and of the armature are conical, the movement thereof towards one another producing the resilient deformation of the disc and reducing the remanence.

9. In an automatic centrifugal clutch according to claim 8, in which said disc is divided into sectors by slots or the like so as to assist the resilient deformation thereof.

10. In an automatic centrifugal clutch having a drive shaft and a driven shaft, in combination, a centrifugal coupling comprising a drum operatively connected to one of said shafts for rotation therewith; a support operatively connected to the other of said shafts for rotation therewith; a plurality of shoes mounted on said support movable between an engaged position in which said shoes engage a peripheral surface of said drum and a disengaged position in which said shoes are spaced from said surface; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; at least one weight means for each of said shoes pivotally mounted on said support and movable independent of the movement of said shoes between an active position in which said weight means directly engages the corresponding shoe to press said shoe against said drum surface with increased pressure and an inactive position; second spring means in the form of spring blades respectively fixed adjacent one end thereof to said weight means, said second spring means tending to keep said weight means in said inactive position, said weight means turning from said inactive to said active position under the influence of centrifugal forces and said second spring means being constructed and arranged so as to exert a counter-moment on said weight means permitting turning of the same from said inactive to said active position thereof under the influence of said centrifgual forces only when said other shaft rotates at a predetermined high speed greater than said predetermined low speed; and a plurality of abutments fixed to said support and projecting therefrom respectively between said weight means and the other ends of said spring blades, said other ends of said spring blades respectively engaging said abutments so as to hold said weight means in their inactive position also in engagement with said abutments, whereby said shoes move from said disengaged to said engaged positions when said other shaft rotates at said predetermined low speed while said weight means stay in said inactive position and said weight means move from said inactive to said active positions when said other shaft rotates at said high speed so that the clutch engagement takes place progressively in two successive stages.

11. In an automatic centrifugal clutch having a drive shaft and a driven shaft, in combination, a centrifugal coupling comprising a drum operatively connected to one of said shafts for rotation therewith; a support operatively connected to the other of said shafts for rotation therewith; a plurality of pivot pins fixed to said support spaced from each other and projecting therefrom substantially parallel to the axis of said shafts; a plurality of shoes respectively pivotally mounted adjacent one end thereof on said pivot pins turnable between an engaged position in which said shoes engage a peripheral surface of said drum and a disengaged position in which said shoes are spaced from said surface; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; at least one weight means for each of said shoes pivotally mounted on said support and movable independent of the movement of said shoes between an active position in which said weight means directly engages the corresponding shoe to press said shoe against said drum surface with increased pressure and an inactive position; and second spring means operatively connected to said weight means and tending to keep said weight means in said inactive position, said weight means turning from said inactive to said active position under the influence of centrifugal forces and said second spring means being constructed and arranged so as to exert a counter-moment on said weight means permitting turning of the same from said inactive to said active position thereof under the influence of said centrifugal forces only when said other shaft rotates at a predetermined high speed greater than said predetermined low speed, whereby said shoes move from said disengaged to said engaged positions when said other shaft rotates at said predetermined low speed while said weight means stay in said inactive position and said weight means move from said inactive to said active positions when said other shaft rotates at said high speed so that the clutch engagement takes place progressively in two successive stages.

12. In an automatic centrifugal clutch having a drive shaft and a driven shaft, in combination, a centrifugal coupling comprising a drum operatively connected to one of said shafts for rotation therewith; a support operatively connected to the other of said shafts for rotation therewith; a plurality of pivot pins fixed to said support spaced from each other and projecting therefrom substantially parallel to the axis of said shafts; a plurality of shoes respectively pivotally mounted adjacent one end thereof on said pivot pins turnable between an engaged position in which said shoes engage a peripheral surface of said drum and a disengaged position in which said shoes are spaced from said surface, each of said shoes having a pair of end portions of relatively large mass connected by an intermediate portion of smaller mass; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; at least one weight means for each of said shoes pivotally mounted on said support and movable independent of the movement of said shoes between an active position in which said weight means directly engages the corresponding shoe to press said shoe against said drum surface with increased pressure and an inactive position; and second spring means operatively connected to said weight means and tending to keep said weight means in said inactive position, said weight means turning from said inactive to said active position under the influence of centrifugal forces and said second spring means being constructed and arranged so as to exert a counter-moment on said weight means permitting turning of the same from said inactive to said active position thereof under the influence of said centrifugal forces only when said other shaft rotates at a predetermined high speed greater than said predetermined low speed, whereby said shoes move from said disengaged to said engaged positions when said other shaft rotates at said predetermined low speed while said weight means stay in said inactive position and said weight means move from said inactive to said active positions when said other shaft rotates at said high speed so that the clutch engagement takes place progressively in two successive stages.

13. In an automatic centrifugal clutch having a drive shaft and a driven shaft, in combination, a centrifugal coupling comprising a drum operatively connected to one of said shafts for rotation therewith; a support operatively connected to the other of said shafts for rotation therewith; a plurality of pivot pins fixed to said support spaced from each other and projecting therefrom substantially parallel to the axis of said shafts; a plurality of shoes respectively pivotally mounted adjacent one end thereof on said pivot pins turnable between an engaged position in which said shoes engage a peripheral surface of said drum and a disengaged position in which said shoes are spaced from said surface, each of said shoes having a pair of end portions of relatively large mass connected by an intermediate portion of smaller mass; flexible wear plates fixed to and extending along an inner surface of said intermediate portion of each shoe; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; at least one weight means for each of said shoes pivotally mounted on said support and movable independent of the movement of said shoes between an active position in which said weight means directly engages said wear plate on the corresponding shoe to press said shoe against said drum surface with increased pressure and an inactive position; and second spring means operatively connected to said weight means and tending to keep said weight means in said inactive position, said weight means turning from said inactive to said active position under the influence of centrifugal forces and said second spring means being constructed and arranged so as to exert a counter-moment on said weight means permitting turning of the same from said inactive to said active position thereof under the influence of said centrifugal forces only when said other shaft rotates at a predetermined high speed greater than said predetermined low speed, whereby said shoes move from said disengaged to said engaged positions when said other shaft rotates at said predetermined low speed while said weight means stay in said inactive position and said weight means move from said inactive to said active positions when said other shaft rotates at said high speed so that the clutch engagement takes place progressively in two successive stages.

14. In an automatic centrifugal clutch having a drive shaft and a driven shaft, in combination, a centrifugal coupling comprising a drum operatively connected to one of said shafts for rotation therewith; a support operatively connected to the other of said shafts for rotation therewith; a plurality of pivot pins fixed to said support spaced from each other and projecting therefrom substantially parallel to the axis of said shafts; a plurality of shoes respectively pivotally mounted adjacent one end thereof on said pivot pins turnable between an engaged position in which said shoes engage a peripheral surface of said drum and a disengaged position in which said shoes are spaced from said surface; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; at least one weight means for each of said shoes pivotally mounted on said support and movable independent of the movement of said shoes between an active position in which said weight means directly engages the corresponding shoe to press said shoe against said drum surface with increased pressure and an inactive position, the distance from the center of gravity of each of said weight means to the turning axis thereof being greater than the distance of the point of contact between said weight means and the shoe coordinated therewith to said axis; and second spring means operatively connected to said weight means and tending to keep said weight means in said inactive position, said weight means turning from said inactive to said active position under the influence of centrifugal forces and said second spring means being constructed and arranged so as to exert a counter-moment on said weight means permitting turning of the same from said inactive to said active position thereof under the influence of said centrifugal forces only when said other shaft rotates at a predetermined high speed greater than said predetermined low speed, whereby said shoes move from said disengaged to said engaged positions when said other shaft rotates at said predetermined low speed while said weight means stay in said inactive position and said weight means move from said inactive to said active positions when said other shaft rotates at said high speed so that the clutch engagement takes place progressively in two successive stages.

15. In an automatic centrifugal clutch having a drive shaft and a driven shaft, in combination, a centrifugal coupling comprising a drum operatively connected to one of said shafts for rotation therewith; a support operatively connected to the other of said shafts for rotation therewith, a plurality of pivot pins fixed to said support spaced from each other and projecting therefrom substantially parallel to the axis of said shafts; a plurality of shoes respectively pivotally mounted adjacent one end thereof on said pivot pins turnable between an engaged position in which said shoes engage a peripheral surface of said drum and a disengaged position in which said shoes are spaced from said surface; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; said first spring means comprising a plurality of spring blades respectively fastened adjacent one end thereof to the end of each shoe distant from the pivot pin thereof; an abutment for each of said spring blades fixed to said support and bearing against the other end of said blade; at least one weight means for each of said shoes pivotally mounted on said support and movable independent of the movement of said shoes between an active position in which said weight means directly engages the corresponding shoe to press said shoe against said drum surface with increased pressure and an inactive position; and second spring means operatively connected to said weight means and tending to keep said weight means in said inactive position, said weight means turning from said inactive to said active position under the influence of centrifugal forces and said second spring means being constructed and arranged so as to exert a counter-moment on said weight means permitting turning of the same from said inactive to said active position thereof under the influence of said centrifugal forces only when said other shaft rotates at a predetermined high speed greater than said predetermined low speed, whereby said shoes move from said disengaged to said engaged positions when said other shaft rotates at said predetermined low speed while said weight means stay in said inactive position and said weight means move from said inactive to said active positions when said other shaft rotates at said high speed so that the clutch engagement takes place progressively in two successive stages.

16. In an automatic centrifugal clutch having a drive shaft and a driven shaft, in combination, a centrifugal coupling comprising a drum operatively connected to one of said shafts for rotation therewith; a support operatively connected to the other of said shafts for rotation therewith; a plurality of pivot pins fixed to said support spaced from each other and projecting therefrom substantially parallel to the axis of said shafts; a plurality of shoes respectively pivotally mounted adjacent one end thereof, leading in direction of rotation of said support, on said pivot pins turnable between an engaged position in which said shoes engage a peripheral surface of said drum and a disengaged position in which said shoes are spaced from said surface; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; at least one weight means for each of said shoes pivotally mounted on said support and movable independent of the movement of said shoes between an active position in which said weight means directly engages the corresponding shoe to press said shoe against said drum surface with increased pressure and an inactive position; and second spring means operatively connected to said weight means and tending to keep said weight means in said inactive position, said weight means turning from said inactive to said active position under the influence of centrifugal forces and said second spring means being constructed and arranged so as to exert a counter-moment on said weight means permitting turning of the same from said inactive to said active position thereof under the influence of said centrifugal forces only when said other shaft rotates at a predetermined high speed greater than said predetermined low speed, whereby said shoes move from said disengaged to said engaged positions when said other shaft rotates at said predetermined low speed while said weight means stay in said inactive position and said weight means move from said inactive to said active positions when said other shaft rotates at said high speed so that the clutch engagement takes place progressively in two successive stages.

17. In an automatic centrifugal clutch having a drive shaft and a driven shaft, in combination, a centrifugal coupling comprising a drum operatively connected to one of said shafts for rotation therewith. A support operatively connected to the other of said shafts for rotation therewith; a plurality of pivot pins fixed to said support spaced from each other and projecting therefrom substantially parallel to the axis of said shafts; a plurality of shoes respectively pivotally mounted adjacent one end thereof on said pivot pins turnable between an engaged position in which said shoes engage a peripheral surface of said drum and a disengaged position in which said shoes are spaced from said surface; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; at least one weight means for each of said shoes pivotally mounted on said support and movable independent of the movement of said shoes between an active position in which said weight means directly engages the corresponding shoe to press said shoe against said drum surface with increased pressure and an inactive position, said weight means turning about their pivot axes during their movement from said inactive to said active position in a direction opposite to the direction said shoes turn about their pivot pins during their movement from said disengaged to said engaged position thereof; and second spring means operatively connected to said weight means and tending to keep said weight means in said inactive position, said weight means turning from said inactive to said active position under the influence of centrifugal forces and said second spring means being constructed and arranged so as to exert a counter-moment on said weight means permitting turning of the same from said inactive to said active position thereof under the influence of said centrifugal forces only when said other shaft rotates at a predetermined high speed greater than said predetermined low speed, whereby said shoes move from said disengaged to said engaged positions when said other shaft rotates at said predetermined low speed while said weight means stay in said inactive position and said weight means move from said inactive to said active positions when said other shaft rotates at said high speed so that the clutch engagement takes place progressively in two successive stages.

18. In an automatic centrifugal clutch having a drive shaft and a driven shaft, in combination, a centrifugal coupling comprising a drum operatively connected to one of said shafts for rotation therewith; a support operatively connected to the other of said shafts for rotation therewith; a plurality of shoes mounted on said support movable between an engaged position in which said shoes engage a peripheral surface of said drum and a disengaged position in which said shoes are spaced from said surface; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; at least one weight means for each of said shoes pivotally mounted on said support and movable independent of the movement of said shoes between an active position in which said weight means directly engages the corresponding shoe to press said shoe against said drum surface with increased pressure and an inactive position; second spring means operatively connected to said weight means and tending to keep said weight means in said inactive position, said weight means turning from said inactive to said active position under the influence of centrifugal forces and said second spring means being constructed and arranged so as to exert a counter-moment on said weight means permitting turning of the same from said inactive to said active position thereof under the influence of said centrifugal forces only when said other shaft rotates at a predetermined high speed greater than said predetermined low speed; and means for adjusting the force of said second spring means, whereby said shoes move from said disengaged to said engaged positions when said other shaft rotates at said predetermined low speed while said weight means stay in said inactive position and said weight means move from said inactive to said active positions when said other shaft rotates at said high speed so that the clutch engagement takes place progressively in two successive stages.

19. In an automatic centrifugal clutch having a drive shaft and a driven shaft, in combination, a centrifugal coupling comprising a drum operatively connected to one of said shafts for rotation therewith; a support operatively connected to the other of said shafts for rotation therewith; a plurality of shoes mounted on said support movable between an engaged position in which said shoes engage a peripheral surface of said drum and a disengaged position in which said shoes are spaced from said surface; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; at least one weight means for each of said shoes pivotally mounted on said support and movable independent of the movement of said shoes between an active position in which said weight means directly engages the corresponding shoe to press said shoe against said drum surface with increased pressure and an inactive position; second spring means operatively connected to said weight means and tending to keep said weight means in said inactive position, said weight means turning from said inactive to said active position under the influence of centrifugal forces and said second spring means being constructed and arranged so as to exert a counter-moment on said weight means permitting turning of the same from the said inactive to said active position thereof under the influence of said centrifugal forces only when said other shaft rotates at a predetermined high speed greater than said predetermined low speed; and limiting means engaging said weight means in the inactive position of the latter for limiting the turning of said weight means under the influence of said second spring means, said limiting means being formed from plastic material, whereby said shoes move from said disengaged to said engaged positions when said other shaft rotates at said predetermined low speed while said weight means stay in said inactive position and said weight means move from said inactive to said active positions when said other shaft rotates at said high speed so that the clutch engagement takes place progressively in two successive stages.

20. In an automatic centrifugal clutch having a drive shaft and a driven shaft, in combination, a centrifugal coupling complrising a drum operatively connected to one of said shafts for rotation therewith; a support operatively connected to the other of said shafts for rotation therewith; a plurality of pivot pins fixed to said support spaced from each other and projecting therefrom substantially parallel to the axis of said shafts; a plurality of shoes respectively pivotally mounted adjacent one end thereof on said pins turnable between an engaged position in which said shoes engage a peripheral surface of said drum and a disengaged position in which said shoes are spaced from said surface; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; at least one weight means for each of said shoes pivotally mounted on said support and movable independent of the movement of said shoes between an active position in which said weight means directly engages the corresponding shoe to press said shoe against said drum surface with increased pressure and an inactive position, said weight means turning about their pivot axes during their movement from said inactive to said active position in a direction opposite to the direction said shoes turn about their pivot pins during their movement from said disengaged to said engaged position thereof; second spring means operatively connected to said weight means and tending to keep said weight means in said inactive position, said weight means turning from said inactive to said active position under the influence of centrifugal forces and said second spring means being constructed and arranged so as to exert a counter-moment on said weight means permitting turning of the same from said inactive to said active position thereof under the influence of said centrifugal forces only when said other shaft rotates at a predetermined high speed greater than said predetermined low speed; and limiting means limiting the turning of said weight means under the influence of said second spring means, said limiting means being formed from plastic material and being fastened to said shoes, respectively, whereby said shoes move from said disengaged to said engaged positions when said other shaft rotates at said predetermined low speed while said weight means stay in said inactive position and said weight means move from said inactive to said active positions when said other shaft rotates at said high speed so that the clutch engagement takes place progressively in two successive stages.

21. In an automatic centrifugal clutch having a drive shaft and a driven shaft, in combination, a centrifugal coupling comprising a drum operatively connected to one of said shafts for rotation therewith; a support operatively connected to the other of said shafts for rotation therewith; a plurality of shoes mounted on said support movable between an engaged position in which said shoes engage a peripheral surface of said drum and a disengaged position in which said shoes are spaced from said surface; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; at least one weight means for each of said shoes pivotally mounted on said support and movable independent of the movement of said shoes between an active position in which said weight means directly engages the corresponding shoe to press said shoe against said drum surface with increased pressure and an inactive position; second spring means operatively connected to said weight means and tending to keep said weight means in said inactive position, said weight means turning from said inactive to said active position under the influence of centrifugal forces and said second spring means being constructed and arranged so as to exert a counter-moment on said weight means permitting turning of the same from said inactive to said active position thereof under the influence of said centrifugal forces only when said other shaft rotates at a predetermined high speed greater than said predetermined low speed; unidirectional means located between said drum and said support and including an inner member fixed to said drum for rotation therewith and an outer member coupled to said inner member only when said drum rotates in one direction; and locking means projecting from said outer member for engaging said shoes during rotation of said outer member to lock said shoes against said drum, whereby said shoes move from said disengaged to said engaged positions when said other shaft rotates at said predetermined low speed while said weight means stay in said inactive position and said weight means move from said inactive to said active positions when said other shaft rotates at said high speed so that the clutch engagement takes place progressively in two successive stages.

22. In an automatic centrifugal clutch having a drive shaft and a driven shaft, in combination, a centrifugal coupling comprising a drum operatively connected to one of said shafts for rotation therewith; a support operatively connected to the other of said shafts for rotation therewith; a plurality of shoes mounted on said support movable between an engaged position in which said shoes engage a peripheral surface of said drum and a disengaged position in which said shoes are spaced from said surface; first spring means connected to said shoes and tending to keep the same in said disengaged position, said first spring means being constructed so as to permit said shoes to move against the force of said spring means from said disengaged position to said engaged position when said other shaft rotates at least at a predetermined low speed; at least one weight means for each of said shoes pivotally mounted on said support and movable independent of the movement of said shoes between an active position in which said weight means directly engages the corresponding shoe to press said shoe against said drum surface with increased pressure and an inactive position; second spring means operatively connected to said weight means and tending to keep said weight means in said inactive position, said weight means turning from said inactive to said active position under the influence of centrifugal forces and said second spring means being constructed and arranged so as to exert a counter-moment on said weight means permitting turning of the same from said inactive to said active position thereof under the influence of said centrifugal forces only when said other shaft rotates at a predetermined high speed greater than said predetermined low speed; abutment means on said weight means; unidirectional coupling means located between said drum and said support and including an inner member fixed to said drum for rotation therewith and an outer member coupled to said inner member only when said drum rotates in one direction; and engagement means projecting from said outer member for engaging said abutment means so as to turn said weight means into the active position thereof to cause clutch engagement when the rotational speed of said drum exceeds that of said other shaft, whereby the clutch engagement takes place progressively in two successive stages.

References Cited in the file of this patent

UNITED STATES PATENTS

| | | |
|---|---|---|
| 1,796,439 | Carrey | Mar. 17, 1931 |
| 2,048,435 | Dodge | July 21, 1936 |
| 2,101,946 | Jonsson | Dec. 14, 1937 |
| 2,104,014 | Banker | Jan. 4, 1938 |
| 2,168,856 | Banker | Aug. 8, 1939 |
| 2,580,869 | Winther | Jan. 1, 1952 |
| 2,790,525 | Jaulmes | Apr. 30, 1957 |